United States Patent
Zhou

(10) Patent No.: US 10,257,866 B2
(45) Date of Patent: Apr. 9, 2019

(54) WIRELESS NETWORK ACCESS POINT CONNECTION METHOD AND TERMINAL

(71) Applicant: ZTE CORPORATION, Shenzhen (CN)

(72) Inventor: Yong Zhou, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 44 days.

(21) Appl. No.: 15/319,849

(22) PCT Filed: Nov. 20, 2014

(86) PCT No.: PCT/CN2014/091803
§ 371 (c)(1),
(2) Date: Dec. 19, 2016

(87) PCT Pub. No.: WO2015/192598
PCT Pub. Date: Dec. 23, 2015

(65) Prior Publication Data
US 2017/0135138 A1    May 11, 2017

(30) Foreign Application Priority Data
Jun. 17, 2014  (CN) .......................... 2014 1 0271302

(51) Int. Cl.
*H04W 4/00* (2018.01)
*H04W 76/11* (2018.01)
(Continued)

(52) U.S. Cl.
CPC ........... *H04W 76/11* (2018.02); *H04L 63/104* (2013.01); *H04W 12/08* (2013.01); *H04W 48/20* (2013.01); *H04W 76/10* (2018.02); *H04L 63/083* (2013.01)

(58) Field of Classification Search
None
See application file for complete search history.

(56) References Cited

U.S. PATENT DOCUMENTS 8,520,853 B2    8/2013  Suzuki et al.
2009/0094680 A1*  4/2009  Gupta .................. H04L 63/104
726/3
(Continued)

FOREIGN PATENT DOCUMENTS

CN    101577977 A    11/2009
CN    101715185 A    5/2010
(Continued)

OTHER PUBLICATIONS

Extended European Search Report dated Jul. 4, 2017, Application No. EP 148953235, 7 Pages.
(Continued)

*Primary Examiner* — Farah Faroul
(74) *Attorney, Agent, or Firm* — Plumsea Law Group, LLC

(57) ABSTRACT

Disclosed is a method and terminal for wireless network access point connection. The method for wireless network access point connection includes: establishing at least one wireless network access point group in a terminal, and setting a common password of the wireless network access point group; and detecting whether a password of each wireless network access point in the wireless network access point group is the common password, and connecting to one wireless network access point with a password which is the common password in the wireless network access point group according to the common password.

18 Claims, 6 Drawing Sheets

(51) Int. Cl.
*H04W 76/10* (2018.01)
*H04W 12/08* (2009.01)
*H04W 48/20* (2009.01)
*H04L 29/06* (2006.01)

(56) References Cited

U.S. PATENT DOCUMENTS

| | | | | |
|---|---|---|---|---|
| 2009/0187983 | A1* | 7/2009 | Zerfos | H04L 63/0823 726/10 |
| 2009/0245176 | A1* | 10/2009 | Balasubramanian | H04W 48/20 370/328 |
| 2012/0026865 | A1* | 2/2012 | Fan | H04W 72/0486 370/225 |
| 2014/0026192 | A1 | 1/2014 | Gatewood et al. | |
| 2015/0087302 | A1 | 3/2015 | Yang | |

FOREIGN PATENT DOCUMENTS

| | | |
|---|---|---|
| CN | 102625310 A | 8/2012 |
| CN | 102711082 A2 | 10/2012 |
| WO | 2014086153 A1 | 6/2014 |

OTHER PUBLICATIONS

PCT International Search Report dated Mar. 23, 2015, Application No. PCT/CN2014/091803, 3 Pages.

\* cited by examiner

WIRELESS NETWORK ACCESS POINT
CONNECTION METHOD AND TERMINAL

CROSS-REFERENCE TO RELATED
APPLICATIONS

This application is the U.S. national phase of PCT Application No. PCT/CN2014/091803 filed on Nov. 20, 2014, which claims priority to Chinese Patent Application No. 201410271302.2 filed on Jun. 17, 2014, the disclosures of which are incorporated in their entirety by reference herein.

TECHNICAL FIELD

The present document relates to the field of wireless network, in particular, to a method and terminal for wireless network access point connection.

BACKGROUND OF THE RELATED ART

At present, after a terminal selects to turn on a wireless network (e.g., a Wi-Fi network), the terminal will automatically search for nearby wireless network APs (Access Points) and display searched wireless network APs in a wireless network access point list of the terminal. When the terminal connects to a certain wireless network access point for the first time, a password needs to be input and the connection can be performed only after the verification of the password is passed. If there are multiple wireless network access points with the same password in the terminal, when the user uses these wireless networks, the password also needs to be respectively input. For example, if passwords of a wireless network in the home of the user, a wireless network in the home of the user's parents and a wireless network in the home of the user's grandma are the same, when the user uses the wireless network in the home of the user, the password needs to be input; when the user uses the wireless network in the home of the user's parents, the password which is the same as the password of the wireless network in the home of the user also needs to be input; and when the user uses the wireless network in the home of the user's grandma, the password which is the same as the password of the wireless network in the home of the user still needs to be input. This operation of repetitively inputting the same password brings inconvenience to the user.

SUMMARY

The main technical problem to be solved by embodiments of the present document is to provide a method and terminal for wireless network access point connection, so as to solve the problem that the same password needs to be repetitively input during connecting to the wireless network access points with the same password.

In order to solve the above-mentioned technical problem, an embodiment of the present document provides a method for wireless network access point connection, including:

establishing at least one wireless network access point group in a terminal, and setting a common password of the wireless network access point group; and detecting whether a password of each wireless network access point in the wireless network access point group is the common password, and connecting to one wireless network access point with a password which is the common password in the wireless network access point group according to the common password.

Alternatively, the step of establishing at least one wireless network access point group in a terminal and setting a common password of the wireless network access point group include:

when the terminal has already connected to one wireless network access point, acquiring first keyword information of the wireless network access point, and jointly forming one wireless network access point group using the connected wireless network access point and other wireless network access points matching the first keyword information in a terminal wireless network access point list, wherein the common password is a password of the connected wireless network access point;

or, the terminal searching for all wireless network access points matching the second keyword information in the terminal wireless network access point list according to second keyword information which is set by a user, and forming one wireless network access point group using all searched wireless network access points, wherein the common password is a password which is preset by the user.

Alternatively, the first keyword information comprises at least one of the following: partial contents or all contents of a name of the connected wireless network access point, and the password of the connected wireless network access point;

the other wireless network access points in the terminal wireless network access point list matching the first keyword information comprises: names and/or passwords of the other wireless network access points in the terminal wireless network access point list matching corresponding contents in the first keyword information;

the second keyword information comprises at least one of the following: partial contents or all contents of names of wireless network access points, and the common password; and the wireless network access points in the terminal wireless network access point list matching the second keyword information comprises: names and/or passwords of the wireless network access points in the terminal wireless network access point list matching corresponding contents in the second keyword information.

Alternatively, the method further includes:

when a wireless network access point is newly added into the terminal wireless network access point list, judging whether the wireless network access point matches the first keyword information or the second keyword information, and if yes, adding the newly-added wireless network access point into the wireless network access point group corresponding to the first keyword information or the second keyword information matching the newly-added wireless network access point.

Alternatively, the method further includes:

when detecting that there is a wireless network access point with a password which is not the common password in the wireless network access point group, removing the wireless network access point from the wireless network access point group.

Alternatively, detecting whether the password of the wireless network access point in the wireless network access point group is the common password is performing by adopting one of the following modes:

when the terminal is located within a wireless network signal coverage range corresponding to the wireless network access point in the wireless network access point group, verifying whether the terminal can establish a connection with the wireless network access point through the common password, and if yes, determining that the password of the wireless network access point is the common password; and when the terminal saves the password of the wireless network access point in the wireless network access point group, judging whether the password of the wireless network access point is consistent with the common password, and if yes, determining that the password of the wireless network access point is the common password.

In order to solve the above-mentioned technical problem, an embodiment of the present document further provides a terminal for wireless network access point connection, including a group establishment module, a detection module and a connection module, wherein, the group establishment module is arranged to establish at least one wireless network access point group in the terminal, and set a common password of the wireless network access point group;

the detection module is arranged to detect whether a password of each wireless network access point in the wireless network access point group is the common password; and the connection module is arranged to connect to one wireless network access point with a password which is the common password in the wireless network access point group according to the common password.

Alternatively, the group establishment module comprises a first keyword information acquisition sub-module, a matching sub-module and a first group establishment sub-module, or the group establishment module comprises a search sub-module and a second group establishment sub-module;

the first keyword information acquisition sub-module is arranged to, when the terminal has already connected to one wireless network access point, acquire first keyword information of the wireless network access point; the matching sub-module is arranged to match wireless network access points in a terminal wireless network access point list with the first keyword information; the first group establishment sub-module is arranged to jointly form one wireless network access point group using the connected wireless network access point and other wireless network access points matching the first keyword information in the terminal wireless network access point list; and the first group establishment sub-module is further arranged to set a password of the connected wireless network access point as the common password;

the search sub-module is arranged to search for all wireless network access points matching second keyword information in the terminal wireless network access point list according to the second keyword information which is set by a user; the second group establishment sub-module is arranged to form one wireless network access point group using all wireless network access points matching the second keyword information; and the second group establishment sub-module is further arranged to set the common password according to a password which is preset by the user.

Alternatively, the first keyword information acquisition sub-module comprises a name acquisition sub-module and/or a password acquisition sub-module, and the matching sub-module comprises a name matching sub-module and/or a password matching sub-module; the name acquisition sub-module is arranged to acquire partial contents or all contents of a name of the connected wireless network access point; the password acquisition sub-module is arranged to acquire the password of the connected wireless network access point; the name matching sub-module is arranged to match names of the other wireless network access points in the terminal wireless network access point list with corresponding contents in the first keyword information; the password matching sub-module is arranged to match passwords of the other wireless network access points in the terminal wireless network access point list with corresponding contents in the first keyword information;

the search sub-module comprises a name search sub-module and/or a password search sub-module; the name search sub-module is arranged to search for wireless network access points matching corresponding contents in the second keyword information in the terminal wireless network access point list; and the password search sub-module is arranged to search for wireless network access points matching corresponding contents in the second keyword information in the terminal wireless network access point list.

Alternatively, the terminal further comprises a judgment module arranged to, when a wireless network access point is newly added into the terminal wireless network access point list, judge whether the wireless network access point matches the first keyword information or the second keyword information, and if yes, add the newly-added wireless network access point into the wireless network access point group corresponding to the first keyword information or the second keyword information matching the newly-added wireless network access point.

Alternatively, the terminal further comprises a removal module arranged to, when the detection module detects that there is a wireless network access point with a password which is not the common password in the wireless network access point group, remove the wireless network access point from the wireless network access point group.

Alternatively, the detection module comprises a verification sub-module and/or a comparison judgment sub-module;

the verification sub-module is arranged to, when the terminal is located within a wireless network signal coverage range corresponding to the wireless network access point in the wireless network access point group, verify whether the terminal can establish a connection with the wireless network access point through the common password, and if yes, determine that the password of the wireless network access point is the common password; and the comparison judgment sub-module is arranged to, when the terminal saves the password of the wireless network access point in the wireless network access point group, judge whether the password of the wireless network access point is consistent with the common password, and if yes, determine that the password of the wireless network access point is the common password.

In order to solve the above-mentioned technical problem, an embodiment of the present document further provides a computer program, including program instructions, wherein, when the program instructions are executed by a terminal for wireless network access point connection, the terminal for wireless network access point connection is enabled to execute the method as described above.

In order to solve the above-mentioned technical problem, an embodiment of the present document further provides a carrier carrying the computer program as described above.

The embodiments of the present document has the following beneficial effects:

the method provided by the embodiments of the present document realizes by establishing the wireless network access point group in the terminal, setting the common password of the wireless network access point group, and detecting the password of the wireless network access point in the group, thereby determining the wireless network access points with passwords which are the common password in the group. When connecting to one wireless network access point with the password which is the common password in the group, the terminal can be connected to the wireless network access point directly through the common password, a user does not need to input a password any longer, thereby solving the problem that the same password needs to be repetitively input during connecting to wireless networks with the same password, and the wireless network connection operation performed by the user is simplified.

EMBODIMENTS OF THE PRESENT DOCUMENT

The embodiments of the present document will be further described in detail below through specific implementation modes with reference to the drawings.

Embodiment 1

Figure 1:
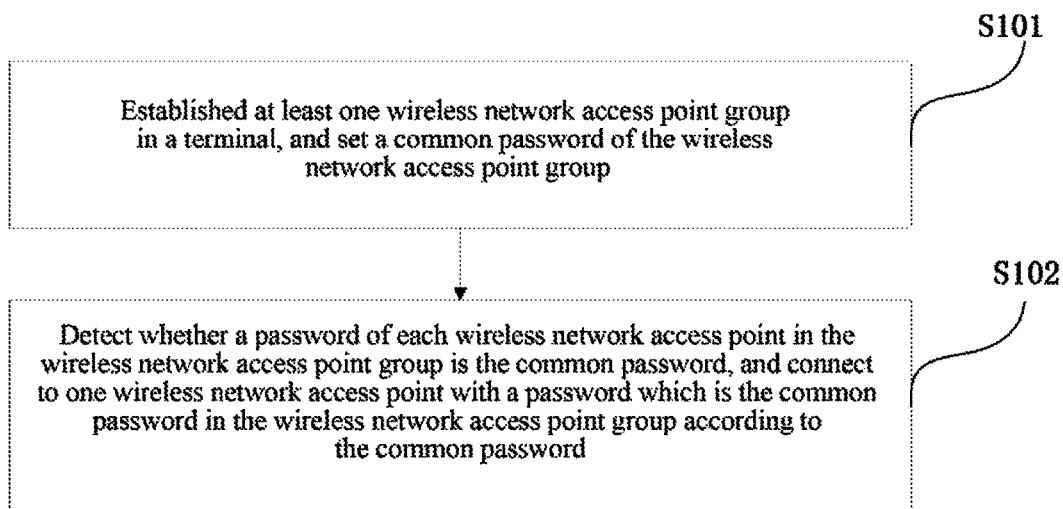
FIG. 1 is a flow chart of a method for wireless network access point connection provided by an Embodiment 1 of the present document.

This embodiment provides a method for wireless network access point connection. Please refer to FIG. 1 which is a flow chart of a method for wireless network access point connection. The method includes the following steps:

In step S101, at least one wireless network access point group is established in a terminal, and a common password of the wireless network access point group is set; the wireless network access point group includes a plurality of wireless network access points.

In step S102, it is detected whether a password of each wireless network access point in the wireless network access point group is the common password, and one wireless network access point with a password which is the common password in the wireless network access point group is connected according to the common password. The terminal, after detecting whether the password of each wireless network access point in the wireless network access point group is the common password, can determine the wireless network access points with passwords which are the common password. When a wireless network access point with a password which is not the common password is detected, the wireless network access point may be removed from the wireless network access point group, so as to guarantee that the passwords of wireless network APs in the group are the common password. When the terminal connects to the wireless network access point through the common password, one wireless network access point may be selected from the group for connecting.

The main thought of the embodiments of the present document is to put wireless network access points with the same password (in this embodiment, "wireless network AP" has the same meaning as "wireless network access point") into the same group, the common password of which is the password of the wireless network APs with the same password in the group. The terminal can be connected to the wireless network APs in the group through the common password. However, when the wireless network AP group is established, a user or a terminal possibly does not know the password of the wireless network AP group and thus does not know which wireless network APs have the same password. As a result, possibly there is a wireless network AP with a password which is not the common password. Therefore, the passwords of the wireless network APs in the group need to be detected, so as to guarantee that the passwords of the wireless network access points in the group are the same and are the same as the common password.

In the above step S101, there are various modes of establishing the wireless network AP group. For example, the group may be established by adopting an artificial selection mode or the group may be established through the terminal by performing matching according to keyword information. The artificial selection mode is a mode in which a user forms a group using wireless network APs with passwords which the user considers to be possibly the same according to the subjective judgment of the user, in this group, there must be one wireless network AP with a password which is known by the user, and the user may set the password as the common password. In order to describe this point in detail, an exemplary example is taken below for description: a wireless network AP list of a terminal (the wireless network AP list includes all wireless network APs which are searched by the terminal and are displayed on the terminal, including wireless network APs previously stored by the terminal and also including wireless network APs newly searched by the terminal) have the following wireless network APs: ABC-1, ABC-2 and ABC-3, a user knows a password of ABC-1 is 123456 and does not save passwords of the other two wireless network APs, the user considers that the passwords thereof are the same because the three wireless network APs belong to the same company, and thus the user forms a wireless network AP group using the three wireless network APs and sets 123456 as a common password thereof. When the user arrives at a network signal coverage range corresponding to ABC-2 for the first time, the terminal may automatically use the password 123456 to try to connect to ABC-2, and if the password of ABC-2 is also 123456, the terminal may be connected to ABC-2. The above-mentioned method lies in that the user selects several wireless network APs to form a group. The user may also firstly make a connection to a certain wireless network AP and then add other wireless network APs together with the connected wireless network AP to form a group.

The above-mentioned method involves establishing the group through the artificial selection mode. Besides, the group may also be established through the terminal by performing matching according to keyword information. The main thought of this method is to search for wireless network APs matching the keyword information in the wireless network AP list. The keyword information includes a type of a keyword and a value of the keyword. The type of the keyword is a type of a keyword which needs to be matched, such as a name and a password of a wireless network AP (in this embodiment, the name of the wireless network AP is an SSID (Service Set Identification), set by a user, of the wireless network). The value of the keyword is a specific value of the keyword. For example, when the type of the keyword is the name of the wireless network AP, the value of the keyword thereof is possibly ABC-1; and when the type of the keyword is the password, the value of the keyword thereof is possibly 123456. If the keyword information includes the name of the wireless network AP, it indicates that the value of the specific keyword of the name of the wireless network AP is defined in the keyword information. The keyword information may be the name and the password of the wireless network AP, partial value in an address of the wireless network AP, etc. The terminal may establish the group by adopting the following modes: when the terminal has already connected to one wireless network access point, first keyword information of the wireless network access point is acquired, a wireless network access point group is jointly formed using other wireless network access points matching the first keyword information in a terminal wireless network access point list and the connected wireless network access point, wherein the common password is a password of the connected wireless network access point; further, the first keyword information may include: partial contents or all contents of a name of the connected wireless network access point, and/or the password of the connected wireless network access point; and the other wireless network access points in the terminal wireless network access point list matching the first keyword information includes: names and/or passwords of the other wireless network access points in the terminal wireless network access point list matching corresponding contents in the first keyword information. Names and/or passwords of the wireless network access points matching corresponding contents in the first keyword information refers to the names of the wireless network APs matching name information in the first keyword information and the passwords of the wireless network APs matching password information in the first keyword information. When the first keyword information includes partial contents or all contents of the name of the connected wireless network AP, the names of the wireless network access points matching the corresponding name information in the first keyword information includes: the names of the wireless network APs containing partial contents or all contents of the name of the connected wireless network AP. For example, the name of the connected wireless network AP is ABC-1 and the first keyword information includes: ABC. When there are wireless network APs with names which are ABC-2 and ABC-3 in the terminal wireless network AP list, the wireless network APs match the first keyword information. If there is another wireless network AP with a name of ABC-1 in the terminal wireless network AP list, the wireless network AP also matches the first keyword information. When the first keyword information includes the password of the connected wireless network AP, the passwords of the wireless network access points matching the corresponding password in the first keyword information includes: the passwords of the wireless network APs being the same as the password in the first keyword information.

The group may also be established through the terminal by performing matching according to the keyword information by adopting the following mode: the terminal searches for all wireless network access points matching the second keyword information in the terminal wireless network access point list according to second keyword information which is set by a user, and forms a wireless network access point group using all wireless network access points matching the second keyword information, wherein the common password is set by the user. The second keyword information includes at least one of the following: partial contents or all contents of names of wireless network access points, and the common password; and the wireless network access points in the terminal wireless network access point list matching the second keyword information includes: names and/or passwords of the wireless network access points in the terminal wireless network access point list matching corresponding contents in the second keyword information. When the second keyword information includes partial contents or all contents of a set name of a wireless network AP, the names of the wireless network access points matching the corresponding name information in the second keyword information includes: the names of the wireless network APs containing partial contents or all contents of the set name of the wireless network AP. For example, the set name of the wireless network AP is ABC-1 and the second keyword information includes: ABC. When there are wireless network APs with names which are ABC-2 and ABC-3 in the terminal wireless network AP list, the wireless network APs match the second keyword information. When the second keyword information includes the set common password, the passwords of the wireless network access points matching the corresponding password in the second keyword information includes: the common password being the same as the password in the second keyword information.

In this embodiment, when a wireless network access point is newly added into the terminal wireless network access point list, whether the wireless network access point matches the first keyword information or the second keyword information may also be judged, and if yes, the newly-added wireless network access point is added into the wireless network access point group corresponding to the first keyword information or the second keyword information matching the newly-added wireless network access point. If no, no processing is performed. The newly added wireless network access point in the terminal wireless network access point list not only may be a new wireless network AP searched by the terminal, but also may be a new wireless network AP added by the user.

In this embodiment, whether the password of the wireless network access point is the common password may be detected by adopting at least one of the following modes: when the terminal is located within a wireless network signal coverage range corresponding to a wireless network access point, whether the terminal may establish a connection with the wireless network access point through the common password is verified, and if yes, it is judged that a password of the wireless network access point is the common password. A verification mode may be as follows: the terminal is connected to the wireless network AP using the common password, and if the connection can be made, it indicates that the password thereof is the common password, and if the connection cannot be made, it indicates that the password of the wireless network AP is not the common password. When a password of a wireless network access point in the wireless network access point group is saved in the terminal, whether the password of the wireless network access point is consistent with the common password is judged, and if yes, it is judged that the password of the wireless network access point is the common password. For some wireless network APs, if the terminal is neither located in the wireless network signal coverage range corresponding to the wireless network AP, nor does it save the password of the wireless network AP therein, processing may not be performed temporarily.

In this embodiment, the established wireless network AP group may include wireless network APs with the same name and may also only include wireless network APs with different names.

Embodiment 2

Figure 2:
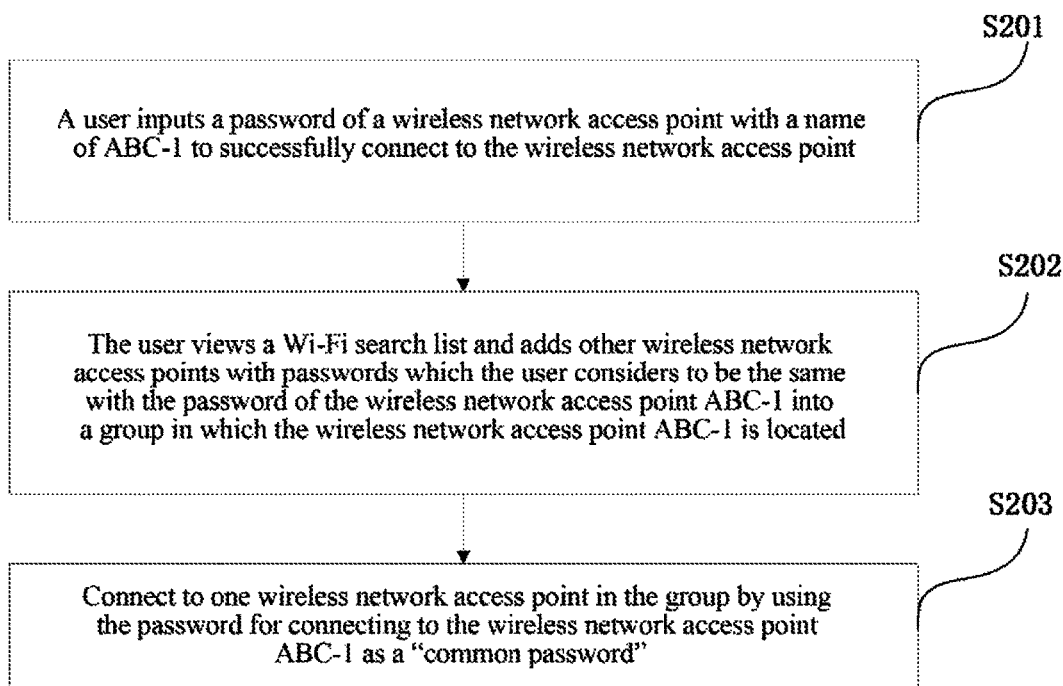
FIG. 2 is a flow chart of a method for wireless network access point connection provided by an Embodiment 2 of the present document.

In order to describe the method for wireless network access point connection provided by the Embodiment 1 in more detail, in this embodiment, a more specific method for wireless network access point connection is provided. Wi-Fi is taken as an example of a wireless network. In this method, it is mainly to artificially select wireless network APs to establish a group. Please refer to FIG. 2, which is a flow chart of a method for wireless network access point connection. The method includes the following steps:

In step S201, a user inputs a password of a wireless network AP with a name of ABC-1 to successfully connect to the wireless network AP.

Figure 3A:
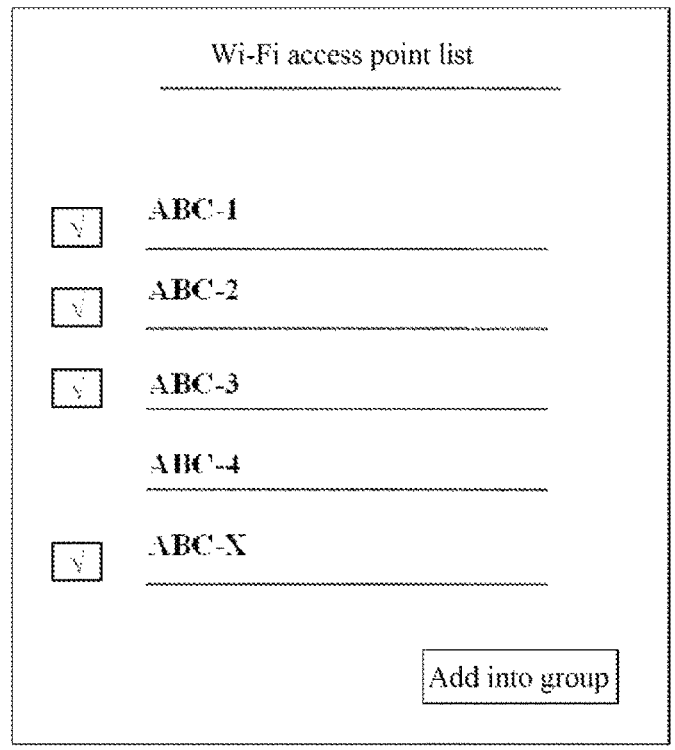
FIG. 3a is a schematic diagram of an interface for selecting wireless network access points during establishing and selecting a wireless network access point group which is provided by an Embodiment 2 of the present document.
Figure 3B:
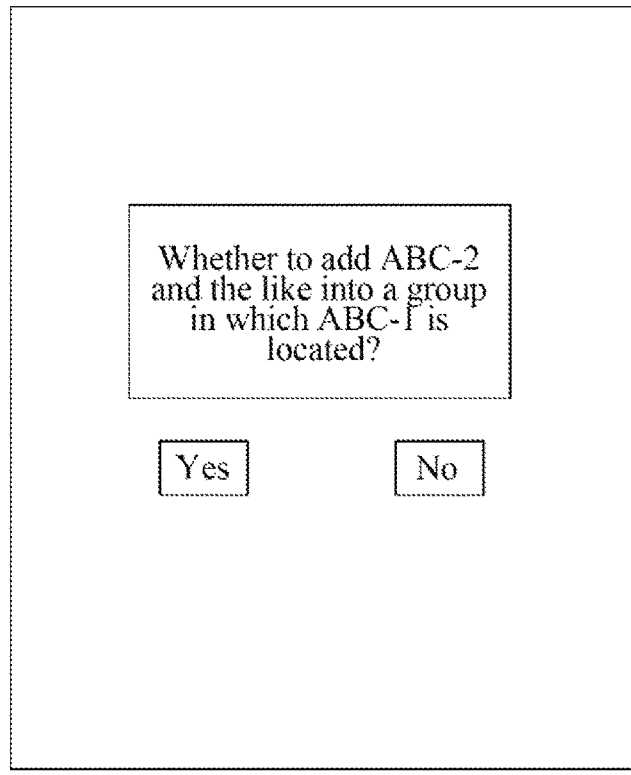
FIG. 3b is a schematic diagram of an interface for enquiring a user during establishing and selecting a wireless network access point group which is provided by an Embodiment 2 of the present document.

In step S202, the user views a Wi-Fi search list and adds other wireless network access points ABC-2, ABC-3 . . . , ABC-X, and the like, with passwords which the user considers to be the same as the password of the wireless network access point ABC-1 into a group G of the wireless network access point ABC-1. Please refer to FIG. 3*a* and FIG. 3*b*, wherein FIG. 3*a* is a schematic diagram of an interface for selecting wireless network access points during establishing and selecting a wireless network access point group; and FIG. 3*b* is a schematic diagram of an interface for enquiring a user during establishing and selecting a wireless network access point group.

In step S203, after the wireless network access points are added into the group G, if a mobile terminal is located in a wireless network signal range corresponding to the wireless network access point ABC-2, the wireless network access point ABC-3, etc., a connection would be made to one wireless network access point in the group G by using a password for connection with the wireless network access point ABC-1 as a "common password".

The user may establish a plurality of groups, and may view, add and delete wireless network APs contained in the groups, and edit the "common password" of each group.

If a password of a certain wireless network access point ABC-X selected by the user is different from the password of the wireless network access point ABC-1 (for example, a memory mistake of the user) and consequently the connection verification of the wireless network access point ABC-X cannot be passed by using the "common password" of the group, the following prompt will be given to the user: the wireless network access point ABC-X has already been automatically removed from the group G due to a password verification error, and the user needs to manually input a new password to connect to the wireless network AP.

If a password of a certain wireless network access point ABC-Y in the group is subsequently changed and consequently the connection verification of the wireless network access point ABC-Y cannot be passed by using the "common password" of the group, the following prompt will also be given to the user: the wireless network access point ABC-Y has already been automatically removed from the group G due to a password verification error, and the user needs to manually input a new password to connect to the access point.

Embodiment 3

Figure 4:
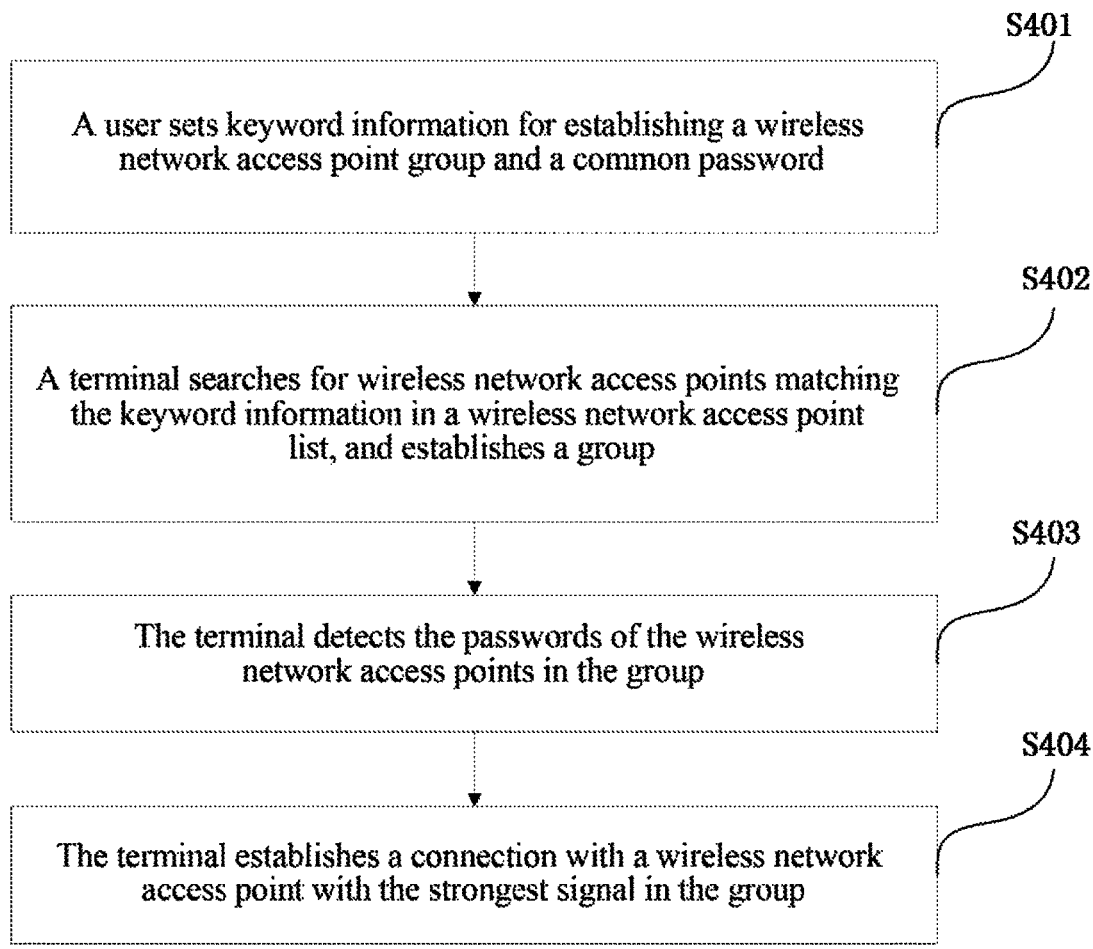
FIG. 4 is a flow chart of a method for wireless network access point connection provided by an Embodiment 3 of the present document.

This embodiment provides a method for wireless network AP connection. In this method, a terminal establishes a group according to keyword information set by a user. Please refer to FIG. 4, the method includes the following steps:

In step S401, a user sets keyword information for establishing a wireless network AP group and a common password, wherein the keyword information includes: ABC contained in names of wireless network APs and passwords which are 123456; and the set common password is 123456.

In step S402, a terminal searches for wireless network APs with wireless network AP names containing ABC information and passwords which are 123456 in a wireless network AP list. Upon searching, wireless network APs, searched by the terminal in the wireless network AP list, with names containing ABC include ABC-1, ABC-2 and ABC-3; and wireless network APs, searched by the terminal in the wireless network AP list, with passwords which are 123456 include xyz. Therefore, the terminal forms a wireless network AP group using ABC-1, ABC-2, ABC-3 and xyz.

In step S403, the terminal detects the passwords of the wireless network APs in the group, the password of ABC-1 is saved in the terminal and is 123456, thus ABC-1 is reserved in the group, the password of xyz is also 123456, and thus xyz is also reserved in the group. Herein, the password of ABC-2 is 654321 and is different from the common password, and thus ABC-2 is removed from the group; and the password of ABC-3 is not stored in the terminal and the terminal is not in a network signal coverage range corresponding to ABC-3, thus the terminal does not perform processing on ABC-3 and verification will be performed the next time when the terminal is in the wireless network signal range.

In step S404, the terminal establishes a connection with a wireless network AP with the strongest signal in the group. The terminal determines a network with the strongest signal in ABC-1, ABC-2 and xyz, the terminal is located in a network signal coverage range corresponding to ABC-2 and xyz, wherein xyz has the strongest signal, and the terminal thus establishes a connection with xyz.

Embodiment 4

Figure 5:
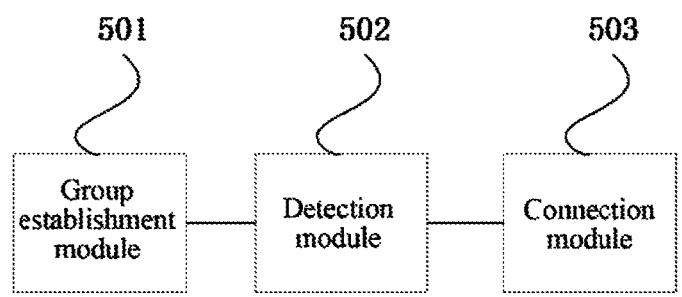
FIG. 5 is a structural diagram of a terminal for wireless network access point connection provided by an Embodiment 4 of the present document.

This embodiment provides a terminal for wireless network AP connection. Please refer to FIG. 5. The device includes: a group establishment module 501, a detection module 502 and a connection module 503; the group establishment module 501 is arranged to establish at least one wireless network access point group in the terminal, and set a common password of the wireless network access point group; the detection module 502 is arranged to detect whether a password of each wireless network access point in the wireless network access point group is the common password; and the connection module 503 is arranged to connect to one wireless network access point with a password which is the common password in the wireless network access point group according to the common password.

Figure 6:
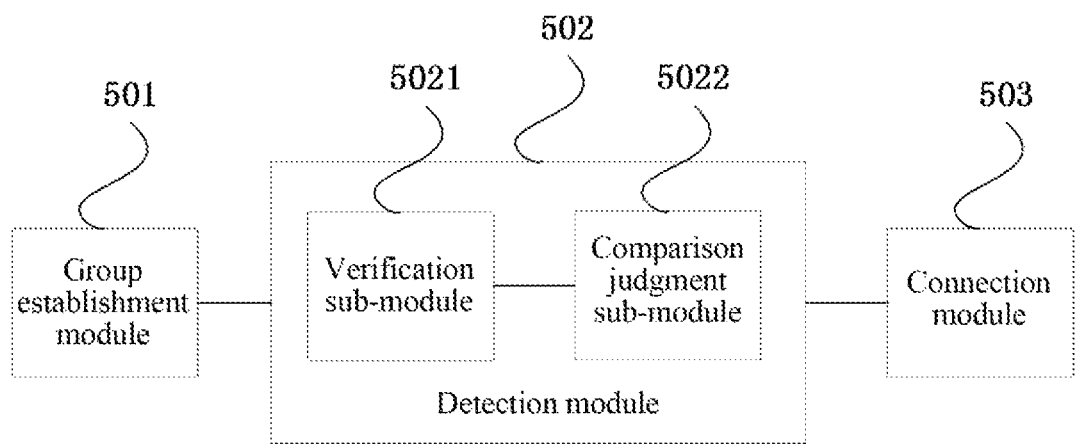
FIG. 6 is a structural diagram of another terminal for wireless network access point connection provided by an Embodiment 4 of the present document.

In this embodiment, another terminal for wireless network AP connection is further provided. Please refer to FIG. 6. The device includes the modules in FIG. 5, wherein the detection module 502 includes a verification sub-module 5021 and/or a comparison judgment sub-module 5022; the verification sub-module 5021 is arranged to, when the terminal is located within a wireless network signal coverage range corresponding to a wireless network access point, verify whether the terminal can establish a connection with the wireless network access point through the common password, and if yes, judge that a password of the wireless network access point is the common password; and the comparison judgment sub-module 5022 is arranged to, when a password of a wireless network access point is saved in the terminal, judge whether the password of the wireless network access point is consistent with the common password, and if yes, judge that the password of the wireless network access point is the common password.

Figure 7:
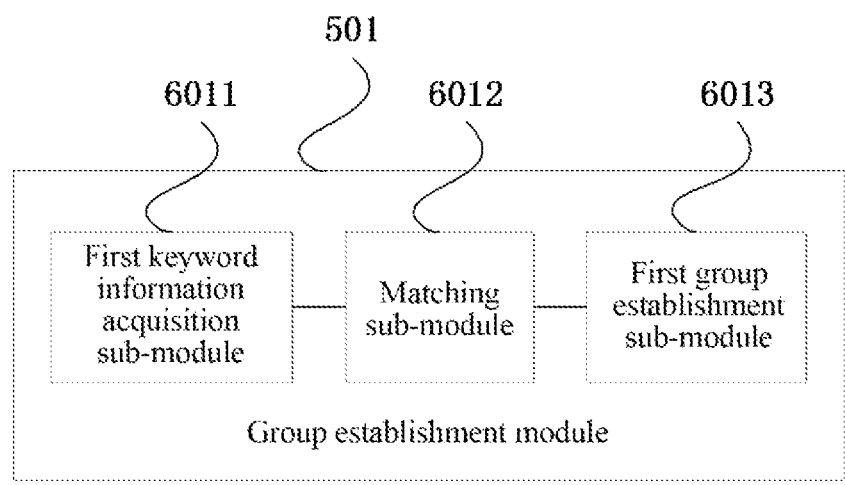
FIG. 7 is a structural diagram of a first group establishment module in a terminal for wireless network access point connection provided by an Embodiment 4 of the present document.

The group establishment module 501 in this embodiment may include a first keyword information acquisition sub-module 6011, a matching sub-module 6012 and a first group establishment sub-module 6013. Please refer to FIG. 7 which is a structural diagram of a first group establishment module provided by this embodiment. The first keyword information acquisition sub-module 6011 is arranged to, when the terminal has already connected to one wireless network access point, acquire first keyword information of the wireless network access point; the matching sub-module 6012 is arranged to match wireless network access points in a terminal wireless network access point list with the first keyword information; the first group establishment sub-module 6013 is arranged to jointly form a wireless network access point group using other wireless network access points matching the first keyword information in the terminal wireless network access point list and the connected wireless network access point; and the first group establishment sub-module 6013 is further arranged to set a password of the connected wireless network access point as the common password.

Figure 8:
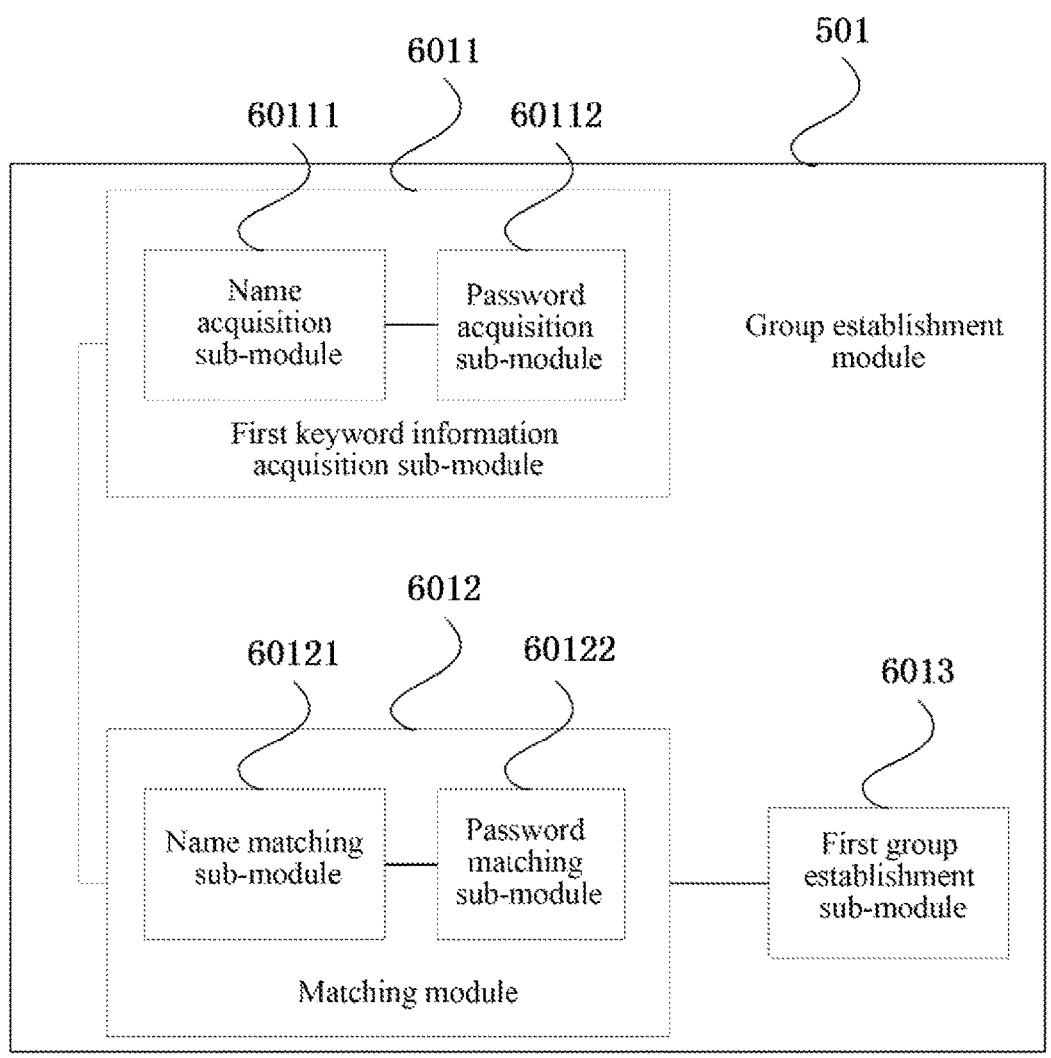
FIG. 8 is a structural diagram of a second group establishment module in a terminal for wireless network access point connection provided by an Embodiment 4 of the present document.

In this embodiment, a second group establishment module is further provided. Please refer to FIG. 8. The group establishment module includes all sub-modules in the group establishment module in FIG. 7, wherein the first keyword information acquisition sub-module 6011 includes a name acquisition sub-module 60111 and/or a password acquisition sub-module 60112, and the matching sub-module 6012 includes a name matching sub-module 60121 and/or a password matching sub-module 60122; the name acquisition sub-module 60111 is arranged to acquire partial contents or all contents of a name of the connected wireless network access point; the password acquisition sub-module 60112 is arranged to acquire the password of the connected wireless network access point; the name matching sub-module 60121 is arranged to match names of the other wireless network access points in the terminal wireless network access point list with corresponding contents in the first keyword information; and the password matching sub-module 60122 is arranged to match passwords of the other wireless network access points in the terminal wireless network access point list with corresponding contents in the first keyword information.

Figure 9:
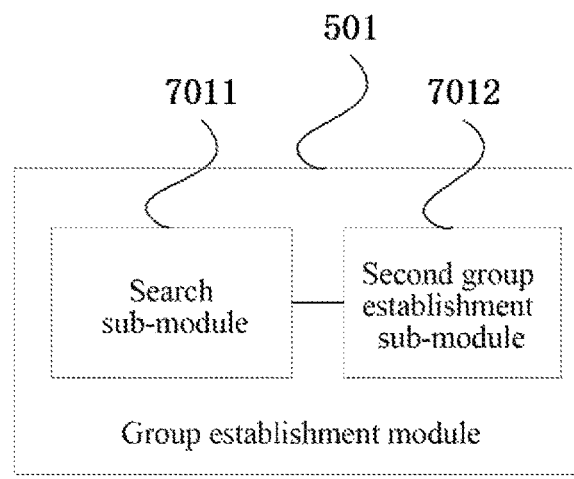
FIG. 9 is a structural diagram of a third group establishment module in a terminal for wireless network access point connection provided by an Embodiment 4 of the present invention.

Please refer to FIG. 9, which is a structural diagram of a third group establishment module provided by this embodiment, wherein the group establishment module 501 may also include a search sub-module 7011 and a second group establishment sub-module 7012.

The search sub-module 7011 is arranged to search for all wireless network access points matching the second keyword information in the terminal wireless network access point list according to second keyword information which is set by a user; the second group establishment sub-module 7012 is arranged to form a wireless network access point group using all wireless network access points matching the second keyword information; and the second group establishment sub-module 7012 is further arranged to determine the common password according to a user setting.

Figure 10:
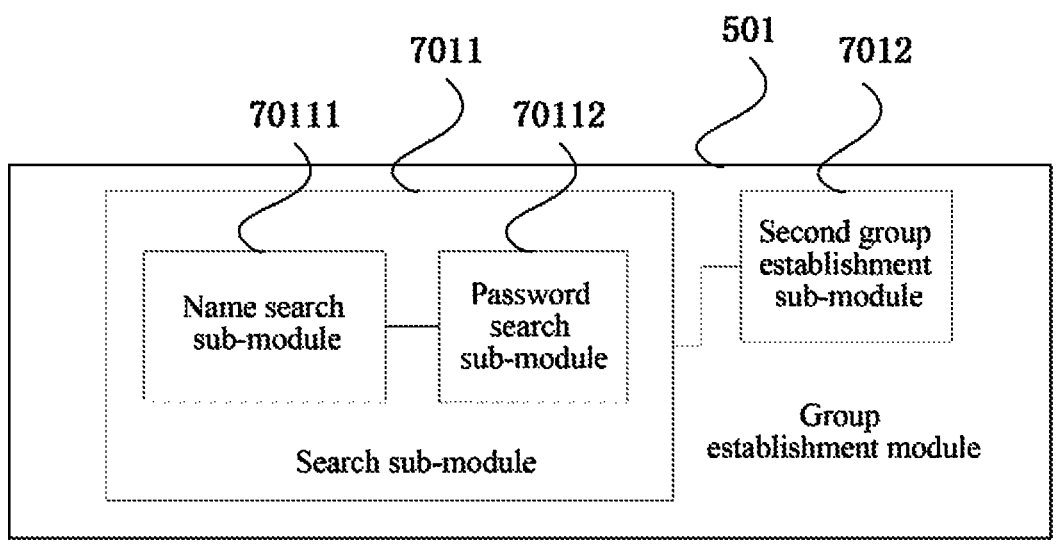
FIG. 10 is a structural diagram of a fourth group establishment module in a terminal for wireless network access point connection provided by an Embodiment 4 of the present invention.

Please refer to FIG. 10, which is a structural diagram of a fourth group establishment module provided by this embodiment. The group establishment module includes all sub-modules in the group establishment module in FIG. 9, wherein the search sub-module 7011 includes a name search sub-module 70111 and/or a password search sub-module 70112; the name search sub-module 70111 is arranged to search for wireless network access points matching corresponding contents in the second keyword information, in the terminal wireless network access point list; and the password search sub-module 70112 is arranged to search for wireless network access points matching corresponding contents in the second keyword information, in the terminal wireless network access point list.

In this embodiment, the terminal further includes a judgment module arranged to, when a wireless network access point is newly added into the terminal wireless network access point list, judge whether the wireless network access point matches the first keyword information or the second keyword information, and if yes, add the newly-added wireless network access point into the wireless network access point group corresponding to the first keyword information or the second keyword information matching the newly-added wireless network access point.

In this embodiment, the terminal further includes a removal module arranged to, when a wireless network access point with a password which is not the common password is detected in the wireless network access point group, remove the wireless network access point from the wireless network access point group.

The above-mentioned contents further describe the present document in detail in combination with the specific implementation modes and the specific implementations of the present document should not be considered as being only limited to the description. For one skilled in the art, various simple deductions or replacements may also be made without departing from the concept of the present document and shall be considered as being included in the protection scope of the present document.

One skilled in the art can understand that all or partial steps in the above method can be completed by relevant hardware instructed by a program, and the program can be stored in a computer-readable storage medium, such as a read-only memory, a magnetic disc or a compact disc, and the like. Alternatively, all or partial steps in the above embodiments can also be implemented by using one or more integrated circuits. Correspondingly, all modules/units in the above embodiments can be implemented in the form of hardware, and can also be implemented in the form of software function modules. The present document shall not be limited to a combination of hardware and software in any specific form.

INDUSTRIAL APPLICABILITY

The above-mentioned technical solution can determines wireless network access points with passwords which are the common password in the group by establishing a wireless network access point group in a terminal, setting a common password of the group, and detecting a password of the wireless network access point in the group. When connecting to one wireless network access point with a password which is the common password in the group, the terminal can be connected to the wireless network access point directly through the common password, a user does not need to input a password any longer, thereby solving the problem that the same password needs to be repetitively input during connecting to wireless networks with the same password, and the wireless network connection operation performed by the user is simplified.

I claim:

1. A method for wireless network access point connection, comprising:
    establishing at least one wireless network access point group in a terminal, and setting a common password of the wireless network access point group;
    detecting whether a password of each wireless network access point in the wireless network access point group is the common password, and connecting to one wireless network access point whose password is the common password in the wireless network access point group according to the common password,
    wherein,
    the step of establishing at least one wireless network access point group in a terminal and setting a common password of the wireless network access point group comprises:
    when the terminal has already connected to one wireless network access point, acquiring first keyword information of the wireless network access point, and jointly forming one wireless network access point group using the connected wireless network access point and other wireless network access points matching the first keyword information in a terminal wireless network access point list, wherein the common password is a password of the connected wireless network access point;
    or, the terminal searching for all wireless network access points matching a second keyword information in the terminal wireless network access point list according to the second keyword information which is set by a user, and forming one wireless network access point group using all searched wireless network access points, wherein the common password is a password which is preset by the user.

2. The method according to claim 1, wherein,
    the first keyword information comprises at least one of the following: partial contents or all contents of a name of the connected wireless network access point, and the password of the connected wireless network access point;
    the other wireless network access points in the terminal wireless network access point list matching the first keyword information comprises: names or passwords of the other wireless network access points in the terminal wireless network access point list matching corresponding contents in the first keyword information;

the second keyword information comprises at least one of the following: partial contents or all contents of names of wireless network access points, and the common password; and
    the wireless network access points in the terminal wireless network access point list matching the second keyword information comprises: names or passwords of the wireless network access points in the terminal wireless network access point list matching corresponding contents in the second keyword information.

3. The method according to claim 2, wherein,
    detecting whether the password of the wireless network access point in the wireless network access point group is the common password is performing by adopting one of the following modes:
    when the terminal is located within a wireless network signal coverage range corresponding to the wireless network access point in the wireless network access point group, verifying whether the terminal can establish a connection with the wireless network access point through the common password, and if yes, determining that the password of the wireless network access point is the common password; and
    when the terminal saves the password of the wireless network access point in the wireless network access point group, judging whether the password of the wireless network access point is consistent with the common password, and if yes, determining that the password of the wireless network access point is the common password.

4. A computer program product, comprising program instructions, wherein, when the program instructions are executed by a terminal for wireless network access point connection, the terminal for wireless network access point connection is enabled to execute the method according to claim 2.

5. The method according to claim 1, further comprising:
    when a wireless network access point is newly added into the terminal wireless network access point list, judging whether the wireless network access point matches the first keyword information or the second keyword information, and if yes, adding the newly-added wireless network access point into the wireless network access point group corresponding to the first keyword information or the second keyword information matching the newly-added wireless network access point.

6. The method according to claim 5, wherein,
    detecting whether the password of the wireless network access point in the wireless network access point group is the common password is performing by adopting one of the following modes:
    when the terminal is located within a wireless network signal coverage range corresponding to the wireless network access point in the wireless network access point group, verifying whether the terminal can establish a connection with the wireless network access point through the common password, and if yes, determining that the password of the wireless network access point is the common password; and
    when the terminal saves the password of the wireless network access point in the wireless network access point group, judging whether the password of the wireless network access point is consistent with the common password, and if yes, determining that the password of the wireless network access point is the common password.

7. A computer program product, comprising program instructions, wherein, when the program instructions are executed by a terminal for wireless network access point connection, the terminal for wireless network access point connection is enabled to execute the method according to claim 5.

8. The method according to claim 1, further comprising:
when detecting that there is a wireless network access point whose password is not the common password in the wireless network access point group, removing the wireless network access point from the wireless network access point group.

9. The method according to claim 1, wherein,
detecting whether the password of the wireless network access point in the wireless network access point group is the common password is performed by adopting one of the following modes:
when the terminal is located within a wireless network signal coverage range corresponding to the wireless network access point in the wireless network access point group, verifying whether the terminal can establish a connection with the wireless network access point through the common password, and if yes, determining that the password of the wireless network access point is the common password; and
when the terminal saves the password of the wireless network access point in the wireless network access point group, judging whether the password of the wireless network access point is consistent with the common password, and if yes, determining that the password of the wireless network access point is the common password.

10. A computer program product, comprising program instructions, wherein, when the program instructions are executed by a terminal for wireless network access point connection, the terminal for wireless network access point connection is enabled to execute the method according to claim 1.

11. A non-transitory computer-readable medium carrying the computer program according to claim 10.

12. A terminal for wireless network access point connection, comprising a group establishment circuit, a detection circuit and a connection circuit, wherein,
the group establishment circuit is arranged to establish at least one wireless network access point group in the terminal, and set a common password of the wireless network access point group;
the detection circuit is arranged to detect whether a password of each wireless network access point in the wireless network access point group is the common password;
the connection circuit is arranged to connect to one wireless network access point whose password is the common password in the wireless network access point group according to the common password,
wherein,
the group establishment circuit comprises a first keyword information acquisition sub-circuit, a matching sub-circuit and a first group establishment sub-circuit, or the group establishment circuit comprises a search sub-circuit and a second group establishment sub-circuit;
the first keyword information acquisition sub-circuit is arranged to, when the terminal has already connected to one wireless network access point, acquire first keyword information of the wireless network access point; the matching sub-circuit is arranged to match wireless network access points in a terminal wireless network access point list with the first keyword information; the first group establishment sub-circuit is arranged to jointly form one wireless network access point group using the connected wireless network access point and other wireless network access points matching the first keyword information in the terminal wireless network access point list; and the first group establishment sub-circuit is further arranged to set a password of the connected wireless network access point as the common password; and
the search sub-circuit is arranged to search for all wireless network access points matching a second keyword information in the terminal wireless network access point list according to the second keyword information which is set by a user; the second group establishment sub-circuit is arranged to form one wireless network access point group using all wireless network access points matching the second keyword information; and the second group establishment sub-circuit is further arranged to set the common password according to a password which is preset by the user.

13. The terminal according to claim 12, wherein,
the first keyword information acquisition sub-circuit comprises a name acquisition sub-circuit or a password acquisition sub-circuit, and the matching sub-circuit comprises a name matching sub-circuit or a password matching sub-circuit; the name acquisition sub-circuit is arranged to acquire partial contents or all contents of a name of the connected wireless network access point; the password acquisition sub-circuit is arranged to acquire the password of the connected wireless network access point; the name matching sub-circuit is arranged to match names of the other wireless network access points in the terminal wireless network access point list with corresponding contents in the first keyword information; the password matching sub-circuit is arranged to match passwords of the other wireless network access points in the terminal wireless network access point list with corresponding contents in the first keyword information; and
the search sub-circuit comprises a name search sub-circuit or a password search sub-circuit; the name search sub-circuit is arranged to search for wireless network access points matching corresponding contents in the second keyword information in the terminal wireless network access point list; and the password search sub-circuit is arranged to search for wireless network access points matching corresponding contents in the second keyword information in the terminal wireless network access point list.

14. The terminal according to claim 13, wherein,
the detection circuit comprises a verification sub-circuit or a comparison judgment sub-circuit;
the verification sub-circuit is arranged to, when the terminal is located within a wireless network signal coverage range corresponding to the wireless network access point in the wireless network access point group, verify whether the terminal can establish a connection with the wireless network access point through the common password, and if yes, determine that the password of the wireless network access point is the common password; and
the comparison judgment sub-circuit is arranged to, when the terminal saves the password of the wireless network access point in the wireless network access point group, judge whether the password of the wireless network access point is consistent with the common password, and if yes, determine that the password of the wireless network access point is the common password.

15. The terminal according to claim 12, wherein,
the terminal further comprises a judgment circuit arranged to, when a wireless network access point is newly added into the terminal wireless network access point list, judge whether the wireless network access point matches the first keyword information or the second keyword information, and if yes, add the newly-added wireless network access point into the wireless network access point group corresponding to the first keyword information or the second keyword information matching the newly-added wireless network access point.

16. The terminal according to claim 15, wherein,
the detection circuit comprises a verification sub-circuit or a comparison judgment sub-circuit;
the verification sub-circuit is arranged to, when the terminal is located within a wireless network signal coverage range corresponding to the wireless network access point in the wireless network access point group, verify whether the terminal can establish a connection with the wireless network access point through the common password, and if yes, determine that the password of the wireless network access point is the common password; and
the comparison judgment sub-circuit is arranged to, when the terminal saves the password of the wireless network access point in the wireless network access point group, judge whether the password of the wireless network access point is consistent with the common password, and if yes, determine that the password of the wireless network access point is the common password.

17. The wireless network access point connection terminal according to claim 12, wherein,
the terminal further comprises a removal circuit arranged to, when the detection circuit detects that there is a wireless network access point whose password is not the common password in the wireless network access point group, remove the wireless network access point from the wireless network access point group.

18. The terminal according to claim 12, wherein,
the detection circuit comprises a verification sub-circuit or a comparison judgment sub-circuit;
the verification sub-circuit is arranged to, when the terminal is located within a wireless network signal coverage range corresponding to the wireless network access point in the wireless network access point group, verify whether the terminal can establish a connection with the wireless network access point through the common password, and if yes, determine that the password of the wireless network access point is the common password; and
the comparison judgment sub-circuit is arranged to, when the terminal saves the password of the wireless network access point in the wireless network access point group, judge whether the password of the wireless network access point is consistent with the common password, and if yes, determine that the password of the wireless network access point is the common password.

\* \* \* \* \*